United States Patent [19]
Yoshii

[11] Patent Number: 5,799,077
[45] Date of Patent: Aug. 25, 1998

[54] METHOD OF AND APPARATUS FOR AUTOMATIC DIALING

[75] Inventor: Satoru Yoshii, Kawasaki, Japan

[73] Assignee: Fujitsu Limited, Kawasaki, Japan

[21] Appl. No.: 387,079

[22] Filed: Feb. 13, 1995

[30] Foreign Application Priority Data

Jul. 28, 1994 [JP] Japan ................... 6-177250

[51] Int. Cl.$^6$ ............ H04M 3/00; H04M 11/00; H04M 3/42; H04M 1/00
[52] U.S. Cl. .............. 379/309; 379/92.01; 379/209; 379/216; 379/265; 379/355
[58] Field of Search .............. 379/216, 355, 379/354, 92, 265, 266, 309, 92.01, 92.02, 92.03, 92.04, 209

[56] References Cited

U.S. PATENT DOCUMENTS

| | | | |
|---|---|---|---|
| 4,696,028 | 9/1987 | Morganstein et al. | 379/213 |
| 4,894,857 | 1/1990 | Szlam et al. | 379/216 |
| 5,271,058 | 12/1993 | Andrews et al. | 379/210 |
| 5,297,195 | 3/1994 | Thorne et al. | 379/218 |
| 5,309,504 | 5/1994 | Morganstein | 379/213 |
| 5,519,773 | 5/1996 | Dumas et al. | 379/266 |
| 5,553,133 | 9/1996 | Perkins | 379/266 |

*Primary Examiner*—Harry S. Hong
*Attorney, Agent, or Firm*—Staas & Halsey

[57] ABSTRACT

An automatic dialing apparatus includes a computer having a dialing control section. The computer issues an automatic dialing instruction to control the operation of the exchange. The dialing control section extracts the customer telephone number from the customer DB, calculates an optimum number of dialings and issues a dialing instruction to the exchange. The number of dialing calls is calculated based on the number of operators, the target operating efficiency, the number of operators in conversation, the number of operators in working, the number of calls during dialing and the responding rate. When the customer is in conversation or absent, the re-dialing is effected at a preset interval and by a preset number of times. The exchange calls the customers via the public circuit network in response to an instruction from the dialing control section, and if a response is made, one of a plurality of operator's telephones is called based on the instruction of the dialing control section and is connected to the line of the customer who has made a response.

23 Claims, 9 Drawing Sheets

FIG. 6

| | SUNDAY | MONDAY | TUESDAY | WEDNESDAY | THURSDAY | FRIDAY | SATURDAY |
|---|---|---|---|---|---|---|---|
| | \multicolumn{7}{c}{RECORD IN PRECEDING WEEK} | | | | | | |
| TIME ZONE IN THE UNIT OF 10 MINUTES | 0.6 | 0.5 | 0.5 | 0.4 | 0.5 | 0.5 | 0.6 |
| ⋮ | ⋮ | | | | | | |
| | 0.6 | 0.5 | 0.5 | 0.4 | 0.5 | 0.5 | 0.6 |

FIG. 7

MONITORING OF OPERATOR STATE        94/03/08  15:17:54

<PRECEDING INSTALLED LINE GROUP>   ONE    PF11 (PRECEDING)   PF12 (DISCRETE)

EXTENSION   TERMINAL No.   OPERATOR              STATE     REGISTERED TIME 2000         001      1001 KAZUYA OZAKI        IN USE       15:10

PF1: OPERATION  PF2: MONITORING  PF3: STATE  PF4: TERMINAL                PF20: END

FIG. 8

```
                              94/03/08  15:17:22
                    MONITORING OF TERMINAL STATE

TERMINAL NUMBER:    1

PROCESS: PRECEDING    OPERATOR:      1001
                                         KAZUYA OZAKI

STATE:     IN USE (IN CONVERSATION)
            STARTING TIME:  15:10:01
        RE-STARTING
        INSTRUCTION:      N      (Y: EXECUTED,
                                  N: NOT EXECUTED)

PLEASE INPUT RE-STARTING INSTRUCTION
```

METHOD OF AND APPARATUS FOR AUTOMATIC DIALING

BACKGROUND OF THE INVENTION

1. Field of the Invention

This invention relates to a telephone automatic dialing system for sequentially calling a plurality of calling destinations (telephones) by automatic dialing, and more particularly to a method of and apparatus for automatic dialing using a predictive dialing system for automatically making a call by automatic dialing and distributing and connecting a line of the called destination which has made a response to a serviceable operator line.

2. Description of the Related Art

For example, the telephone automatic dialing system is often used in the dialing telephone service whose main purpose is to call customers or subjects as in a questionnaire service or dunning service by use of a telephone in the sales business on credit, banking business, or circulation business. The dialing telephone service is called an out-bound telephone service.

The telephone automatic dialing system used in the out-bound telephone service is roughly divided into an auto-call system and a predictive dialing system (office line pre-calling system).

The auto-call system is a system for automatically dialing to automatically make a call by use of the private branch exchange (PBX) and starts the automatic dialing for a next destination after the service for a preceding destination (calling destination) is completed. Therefore, in a period of time when the automatic dialing is effected until the destination of the automatic dialing makes a response, the telephone of the operator is substantially set in an idle state, thus lowering the efficiency of the dialing service.

The predictive dialing system is also called a predictive call system, and detects that the destination of the automatic dialing has made a response after the automatic calling is made by the automatic dialing and distributes and connects the line to an available one of the telephone sets of the operators connected to the private branch exchange, for example. In this case, since only the line of the destination which has made a response is connected to the telephone set of the operator, the automatic dialing can be previously made before the service for one destination is completed and the useless waiting time of the operator can be reduced since the destination is not connected to the operator in the waiting time before the destination responds to the previous automatic dialing, thereby enhancing the efficiency of the automatic dialing service. However, in this case, it is necessary to adequately set the automatic dialing timing so as to immediately distribute the destination line to the available telephone set of the operator when the destination responds to the automatic dialing.

Therefore, in the conventional predictive dialing system, the average response time for each destination and the service record and the progress of service of each operator are provided as data bases, for example. The system causes the telephone set of each operator to start the next automatic dialing based on the above data bases so as to reduce the idle time caused by the response waiting time and enhance the efficiency of the automatic dialing service.

In the above conventional predictive dialing system, since the automatic dialing is made for each of the telephone sets of the operators based on the average response time for each destination and the progress of service of each operator, the response waiting time of each operator is reduced. However, since the telephone set of the operator which is connected when the destination makes a response is already determined at the time of automatic dialing and the automatic dialing is made basically by predicting the serviceable condition of the operators, the waiting state of the operator or the destination occurs if the operation of the operator is not completed as predicted, thus making it impossible to sufficiently enhance the efficiency of the service as a whole.

SUMMARY OF THE INVENTION

An object of this invention is to provide a method and apparatus for automatic dialing, for always adequately setting the number of dialing calls based on the condition to effectively reduce the waiting time of the operator, and to enhance the efficiency of the service.

The above object can be attained by an automatic dialing method of this invention which comprises a call number determining step of determining the number of dialing calls based on the number of serviceable operators; a number extraction step of extracting telephone numbers of to-be-called destinations of a number equal to the number of dialing calls from the destination data base; a dialing step of automatically dialing the extracted telephone numbers; an operator calling step of calling and connecting a telephone set of the operator to a line of the destination which has made a response; an additional call number calculating step of deriving the number of destinations to be additionally extracted based on the number of serviceable operators and the number of unresponding destinations which are to be re-dialed; an additional number extraction step of additionally extracting destination telephone numbers from the destination data base based on the calculated number of destinations to be extracted; and an additional dialing step of automatically dialing the extracted telephone numbers and the telephone numbers of the unresponding destinations which are to be re-dialed; the operator calling step being also effected after the additional dialing step.

In the above automatic dialing method, the additional call number calculating step may include a number-of-operators-in-conversation calculating step of deriving the number of operators in conversation and an operator number calculating step of deriving the number of serviceable operators based on the derived number of operators in conversation and the actual total number of operators. The additional call number calculating step may include a number-of-operators-in-conversation calculating step of deriving the number of operators in conversation, a number-of-operators-in-operation calculating step of deriving the number of operators in operation and an operator number calculating step of deriving the number of serviceable operators based on the derived number of operators in conversation, the derived number of operators in operation and the actual total number of operators.

Further, the additional call number calculating step may include a time determining step of determining whether or not a preset period of time has elapsed after the unresponding destination was determined as an unresponding destination in the preceding cycle, and a re-dialing number calculating step of deriving the number of unresponding destinations which are to be re-dialed based on the unresponding destinations in which the preset period of time is determined to have elapsed.

Further, the additional call number calculating step may include a reason discriminating step of discriminating the reason of the unresponding according to whether the destination was determined as an unresponding destination in the preceding cycle because the destination was in conversation or because the destination did not make a response, a time determining step of determining whether or not a preset period of time corresponding to the reason of the unresponding has elapsed after the unresponding destination was determined as an unresponding destination in the preceding cycle, and a re-dialing number calculating step of deriving the number of unresponding destinations which are to be re-dialed based on the unresponding destinations in which the preset period of time is determined to have elapsed. The additional call number calculating step may be a step of determining the number of destinations to be additionally extracted according to a predetermined target operating efficiency.

Further, the additional call number calculating step may be a step of determining the number of destinations to be additionally extracted according to the rate of responding by the destination for each previously prepared time factor and the time factor may include at least one of a time zone, day of the week, date and month. Further, it may include a step of updating the rate of responding by the destination based on the history of the actual responding.

Another automatic dialing method of this invention comprises a reason discriminating step of discriminating the reason of the unresponding according to whether the destination was determined as an unresponding destination in the preceding cycle because the destination was in conversation or because the destination did not make a response; and a re-dialing step of re-dialing the unresponding destination after a preset period of time corresponding to the reason of the unresponding has elapsed.

An automatic dialing apparatus of this invention comprises operator number detecting means for detecting the number of serviceable operators; call number calculating means for deriving a required number of destinations to be newly extracted according to the number of unresponding destinations to be re-dialed and the number of serviceable operators; number extracting means for extracting the telephone numbers of to-be-called destinations of a number equal to the required number of destinations from a destination data base; dialing means for automatically dialing the extracted telephone numbers and the telephone numbers of the unresponding destinations to be re-dialed; and operator calling means for calling and connecting a telephone set of the operator to a line of the destination which has made a response.

In the automatic dialing apparatus, the operator number detecting means may include number-of-operators-in-conversation calculating means for deriving the number of operators in conversation and operator number calculating means for deriving the number of serviceable operators based on the derived number of operators in conversation and the actual total number of operators. The operator number calculating means may include number-of-operators-in-conversation calculating means for deriving the number of operators in conversation, number-of-operators-in-operation calculating means for deriving the number of operators in operation and operator number calculating means for deriving the number of serviceable operators based on the derived number of operators in conversation, the derived number of operators in operation and the actual total number of operators.

Further, the call number calculating means may include time determining means for determining whether or not a preset period of time has elapsed after the unresponding destination was determined as an unresponding destination in the preceding cycle, and re-dialing determining means for determining unresponding destinations to be re-dialed based on the unresponding destinations in which the preset period of time is determined to have elapsed. The call number calculating means may include reason discriminating means for discriminating the reason of the unresponding according to whether the destination was determined as an unresponding destination in the preceding cycle because the destination was in conversation or because the destination did not make a response, time determining means for determining whether or not a preset period of time corresponding to the reason of the unresponding has elapsed after the unresponding destination was determined as an unresponding destination in the preceding cycle, and re-dialing determining means for determining unresponding destinations which are to be re-dialed based on the unresponding destinations in which the preset period of time is determined to have elapsed. The time determining means may include means for setting the elapse time to be determined longer in a case where the reason of the unresponding is that the destination did not make a response than in a case where the reason of the unresponding is that the destination was in conversation.

Further, the call number calculating means may include means for determining the number of destinations to be dialed according to a predetermined target operating efficiency. The call number calculating means may include means for determining the number of destinations to be dialed according to the rate of responding by the destination for each previously prepared time factor. The call number calculating means may include means for determining the number of destinations to be dialed according to the rate of responding by the destination for each previously prepared time factor including at least one of a time zone, day of the week, date and month. Further, it may include means for updating the rate of responding by the destination based on the history of the actual responding.

Another automatic dialing apparatus of this invention comprises reason discriminating means for discriminating the reason of the unresponding according to whether the destination was determined as an unresponding destination in the preceding cycle because the destination was in conversation or because the destination did not make a response; and re-dialing means for re-dialing the unresponding destination after a preset period of time corresponding to the reason of the unresponding has elapsed.

In the method of and apparatus for automatic dialing according to this invention, the number of destinations to be additionally extracted is repeatedly derived based on the number of serviceable operators who are ready for telephone calls and the number of unresponding destinations to be re-dialed. The telephone numbers of the destinations are additionally extracted from the destination data base based on the derived number of destinations to be extracted, the extracted telephone numbers and the telephone numbers of the unresponding destinations to be re-dialed are automatically dialed, and the operator for a line of the destination which has made a response is called and connected to the line so that the number of dialing calls can always be adequately set according to the condition, the wait time of the operator can be effectively reduced and the operation efficiency can be enhanced. As the factor of condition for determining the number of dialing calls, the rate of responding by the destination for each time factor including at least one of time zone, day of the week, date and month, the elapse time, the target operating efficiency, the number of operators who are neither in conversation nor in operation, and the reason of the unresponding of the destination can be used.

Further, in the method of and apparatus for automatic dialing according to this invention, the re-dialing can be effected to meet the condition of the destination by discriminating the reason of the unresponding for the unresponding destination according to whether the destination was determined as an unresponding destination in the preceding cycle because the destination was in conversation or because the destination did not make a response and re-dialing the unresponding destination after a preset period of time corresponding to the reason of the unresponding has elapsed.

BRIEF DESCRIPTION OF THE DRAWINGS

Other objects and advantages of the invention will become apparent during the following discussion in conjunction with the accompanying drawings, in which:

FIG. 6 is a diagram showing one example of a responding rate table, for illustrating the operation of the automatic dialing system of FIG. 1;

FIG. 7 is a diagram showing one example of the terminal state monitoring image plane displaying the state of the operator, for illustrating the operation of the automatic dialing system of FIG. 1;

FIG. 8 is a diagram showing one example of the terminal state monitoring image plane displaying the state of the terminal, for illustrating the operation of the automatic dialing system of FIG. 1.

DESCRIPTION OF THE PREFERRED EMBODIMENTS

There will now be described an embodiment of an automatic dialing system by the predictive dialing according to this invention with reference to the accompanying drawings.

First Embodiment

Figure 1:
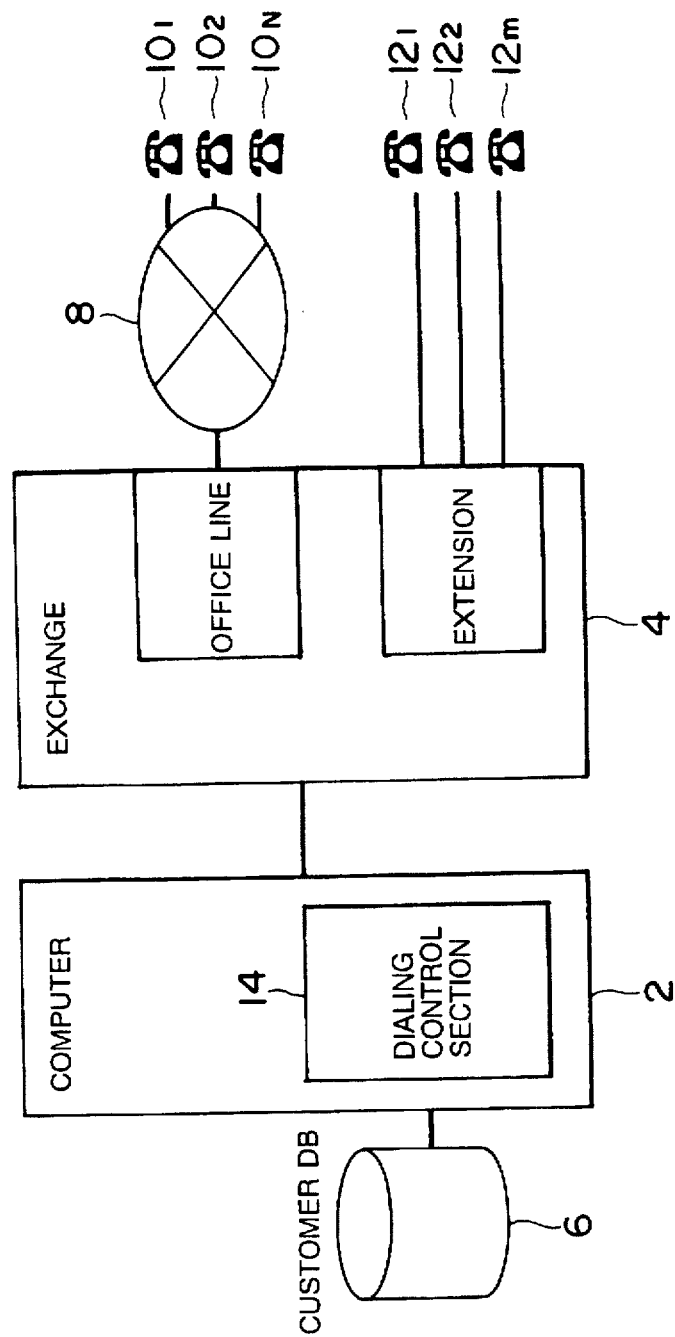
FIG. 1 is a block diagram showing the construction of a first embodiment of an automatic dialing system according to this invention.

FIG. 1 shows the construction of a principle automatic dialing system according to the first embodiment of this invention.

The automatic dialing system of FIG. 1 includes a computer 2, exchange 4 and customer data base (which is hereinafter referred to as "customer DB") 6. The automatic dialing system calls a plurality of destinations, for example, customers by the automatic dialing. If the customer makes a response, the system calls a serviceable operator and connects the operator to the line of the customer who has made a response.

The office line of the exchange 4 is connected to a public telephone circuit network 8 and a plurality (of telephones) of customers $10_1, 10_2, \ldots, 10_N$ subscribe to the public telephone circuit network 8. The extensions of the exchange 4 are connected to a plurality of telephone sets $12_1, 12_2, \ldots, 12_m$ of the operator.

The computer 2 has a dialing control section 14 for executing the dialing algorithm, and gives an optimum automatic dialing instruction according to the dialing algorithm and controls the operation of the exchange 4 according to the dialing algorithm. The computer 2 is connected to terminal devices such as work stations placed at the hand of respective operators via the network and can cause the respective terminal devices to display messages and get information on the operating conditions of the terminal devices. The dialing control section 14 extracts customer's telephone numbers from the customer DB 6 according to the dialing algorithm, calculates an optimum dialing call number and gives an instruction of dialing to the exchange 4. Further, when one of the customers $10_1, 10_2, \ldots, 10_N$ makes a response, the dialing control section 14 controls the exchange 4 to call an adequate one of the telephone sets $12_1, 12_2, \ldots, 12_m$ of the operator so as to cause the line of the responding customer $10_1, 10_2, \ldots, 10_N$ to be connected. The concrete operation of the dialing control section 14 is explained in detail later.

The exchange 4 calls part of the plurality of customers $10_1, 10_2, \ldots, 10_N$ via the public circuit network 8 in response to the instruction from the dialing control section 14, and if a response from the customer $10_1, 10_2, \ldots, 10_N$ is received, it calls one of the telephone sets $12_1, 12_2, \ldots, 12_m$ of the operator based on the instruction of the dialing control section 14 and connects the line of a responding one of the customers $10_1, 10_2, \ldots, 10_N$. The telephone numbers of the customers $10_1, 10_2, \ldots, 10_N$, the rate of responding thereof for each time period and other data relating to the customers $10_1, 10_2, \ldots, 10_N$ are stored in the customer DB 6.

Figure 2:
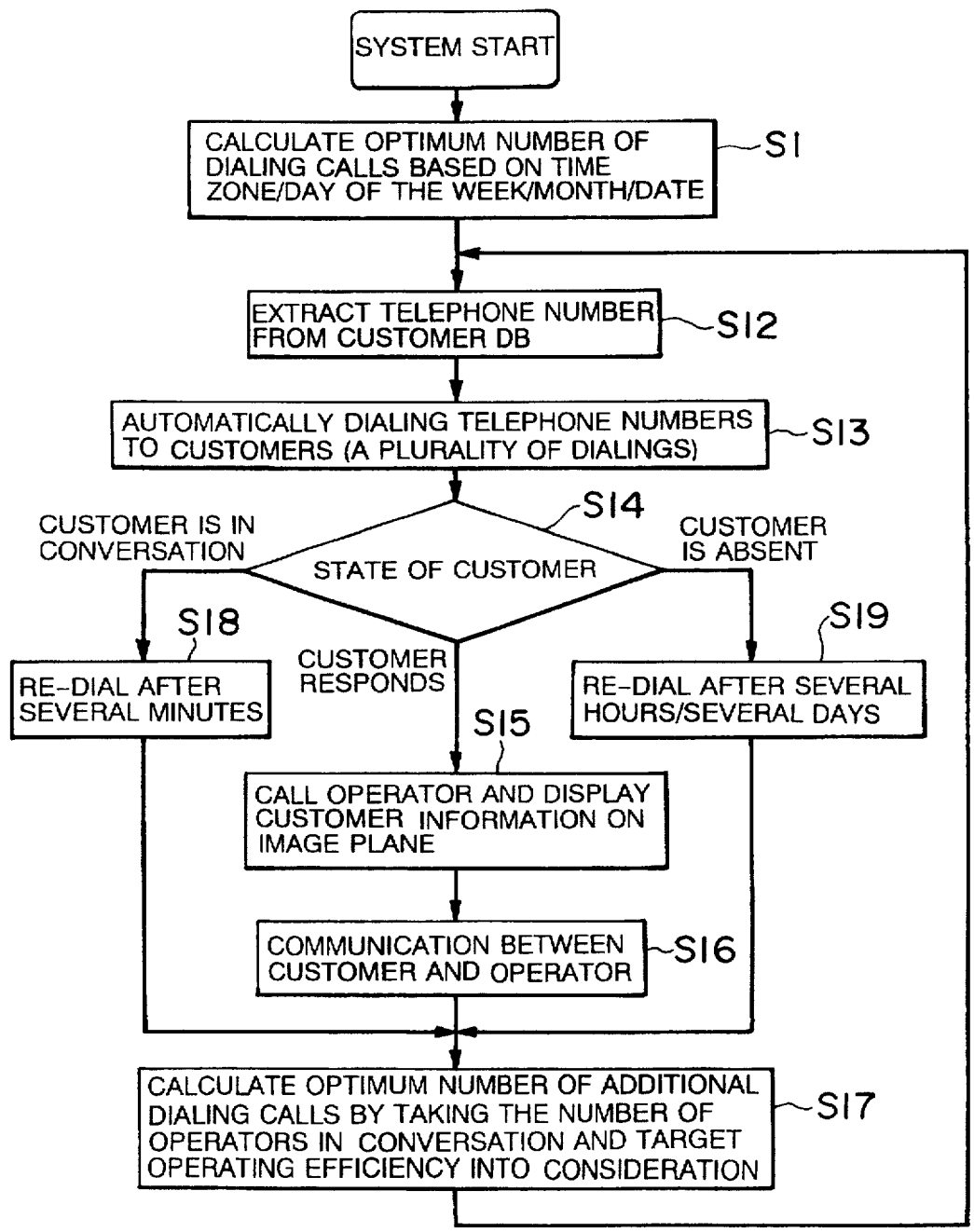
FIG. 2 is a flowchart for illustrating the automatic dialing process in the system of FIG. 1.
Figure 3:
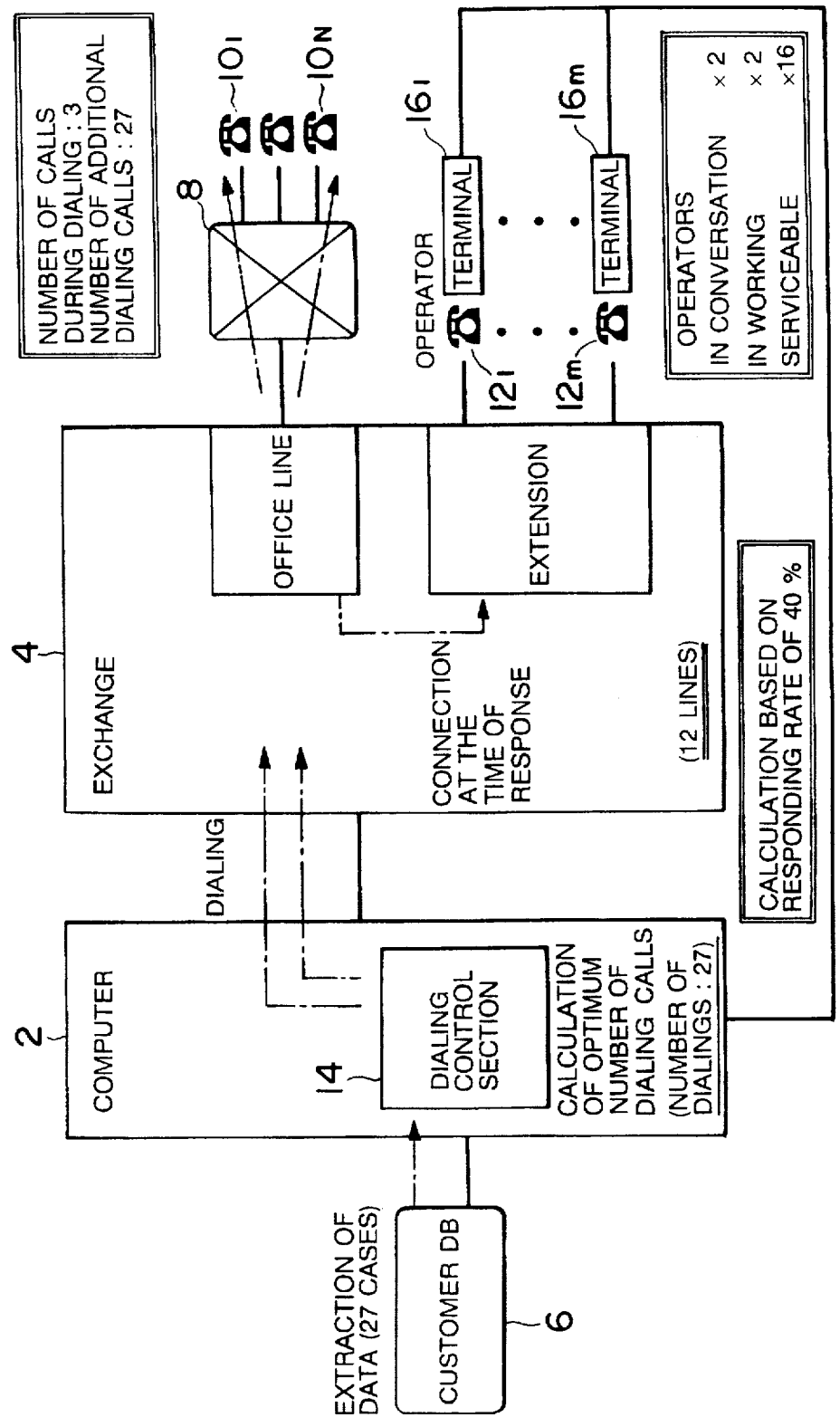
FIG. 3 is an operation illustrating conceptional diagram for illustrating the operation of the automatic dialing system of FIG. 1.

Now, the operation of the automatic dialing system with the above construction is explained. FIG. 2 shows the flowchart of the dialing algorithm executed mainly in the dialing control section 14 of the automatic dialing system. FIG. 3 schematically shows the concept of the operation of the automatic dialing system.

When the system is started, an optimum dialing call number is derived according to the equation (1) based on the time zone, day of the week, month and date (step S11).

$$\text{The dialing call number} = \begin{cases} \dfrac{m \times \mu - (k + w)}{\alpha} & -L \quad (m \times \mu > k + w) \\ 0 & (m \times \mu \leq k + w) \end{cases} \quad (1)$$

In the equation (1), m indicates the number of operators, μ indicates the target operating efficiency, k indicates the number of operators in conversation, w indicates the number of operators in working, L indicates the number of calls during the dialing and α indicates the rate of responding. If, at the time of start of the system, the number k of operators in conversation, the number w of operators working, and the number L of calls during the dialing are all "0", then the equation (1) can be substantially expressed by the following equation (2).

$$\text{The dialing call number} = \dfrac{m \times \mu}{\alpha} \quad (2)$$

The target operating efficiency μ is adequately determined by the controller of the automatic dialing system or the like according to the number of customers, the states of the customers, the total number of operators, the operating conditions of the operators, the business condition of the company and the like.

Telephone number data items of a number equal to the above dialing call number are extracted from the customer DB 6 (step S12). The telephone numbers of customers of a number equal to the above dialing call number are automatically dialed via the exchange 4 according to the telephone numbers extracted in the step S12 (step S13). That is, in the step S13, the exchange 4 effects the automatic dialing from the office line to the public circuit network 8 to call the customers $10_1, 10_2, \ldots, 10_N$.

Based on the states of responding of the customers to the automatic dialing, the state of the customer is determined for each customer (each telephone number) (step S14). That is, the state of the customer includes three states: (1) the normal responding state in which the customer normally makes a response, (2) the customer-in-conversation state in which the customer does not make a response, a busy tone is received and it is determined that the customer is in conversation, and (3) the absence-of-customer state in which the customer does not respond to a ring back tone for a preset period of time and it is determined that the customer is absent. In the step S14, one of different processes is effected according to the above three states. When an automatic answering telephone makes a response, it is determined as the normal response, and the line is connected to the operator. However, since the customer is absent when the automatic answering telephone makes a response, the operator gives information on the fact that the automatic answering telephone has made a response from the terminal to the system, and after this, the state of the customer may be treated as the absence-of-customer state in the system. Further, if there is provided an adequate method for automatically determining that the automatic answering telephone makes a response, the state may be automatically treated as the absence-of-customer state when determining that the automatic answering telephone has made a response.

In the step S14, when the customer $10_1, 10_2, \ldots, 10_N$ normally makes a response, the telephone set $12_1, 12_2, \ldots, 12_m$ of the operator is called via the extension, information of the customer $10_1, 10_2, \ldots, 10_N$ who has made a response is displayed on the terminal device of the operator, and the line of the corresponding customer is connected to the telephone set $12_1, 12_2, \ldots, 12_m$ of the operator when the operator responds to the telephone call (step S15). When the line of the customer $10_1, 10_2, \ldots, 10_N$ is connected to the telephone set $12_1, 12_2, \ldots, 12_m$ of the operator in the step S15, a conversation is held between the customer and the operator (step S16).

The following procedure may be substituted for the steps S14 through S16. During the automatic dialing, the operator sets the telephone set $12_1, 12_2, \ldots, 12_m$ to a standby state for enabling automatic response prior to a response of the customer. When the customer $10_1, 10_2, \ldots, 10_N$ normally makes a response, a conversation is immediately held between the customer and the operator.

After the conversation is held between the customer and the operator (no problem occurs even if the conversation is not completed), the number of dialing calls to be additionally dialed is calculated based on the equation (1) by taking the number k of operators in conversation, the target operating efficiency μ, the number W of operators in working, and the number L of calls during the dialing for each preset time period into consideration (step S17). In this case, since the number of dialing calls is equal to the number of additional dialing calls, it can be expressed by the following equation (3).

$$\text{The number of additional dialing calls} = \begin{cases} \dfrac{m \times \mu - (k+w)}{\alpha} - L & (m \times \mu > k+w) \\ 0 & (m \times \mu \leq k+w) \end{cases} \quad (3)$$

After the number of additional dialing calls is derived in the step S17, the process is returned to the step S12 and the process succeeding the step S12 is effected again according to the derived number of additional dialing calls.

The responding rate a is stored in the customer data base as a responding rate table shown in FIG. 6 as one example. For example, as shown in FIG. 6, the responding rate table is constructed by responding rates for each time period in the unit of 10 minutes for each day of the week on respective days of the week from Sunday to Saturday. As shown in FIG. 6, the responding rate table may be properly formed based on the record or result in the immediately preceding week or fixedly set based on data previously adequately collected. It may be fixedly set for responding rate data for the repetition period which is relatively long as in the month or date (i.e., once a year), but it is preferable to accumulate data of past records at the time of operation of the system and update responding rate data for the repetition period which is relatively short as in the day of the week or time zone of one day at a desired time.

Further, the number w of working operators is measured by checking the operating conditions of terminal devices $16_1, 16_2, \ldots, 16_m$ (FIG. 3) of a work station provided for each operator from the computer 2 side via a network for connecting the computer 2 to the terminal devices $16_1, 16_2, \ldots, 16_m$. For example, the usage states of the terminal devices $16_1, 16_2, \ldots, 16_m$ can be displayed on a display unit (not shown) of the computer 2 as the operator state monitoring image plane as shown in FIG. 7 or the terminal state monitoring image plane as shown in FIG. 8 and information creating the image can be used as information indicating the operating condition of the terminal devices $16_1, 16_2, \ldots, 16_m$ as it is.

If the customer-in-conversation state is determined in the step S14, it is generally possible to suppose that the customer is not absent during conversation (although there is an exceptional case in which the automatic answering telephone makes a response to another call) and there is a sufficient possibility that a response can be obtained in a short period of time, and therefore, it is set to re-dial after a relatively short period of time, for example, after several minutes (step S18) and the process is returned to the step S17.

Figure 4:
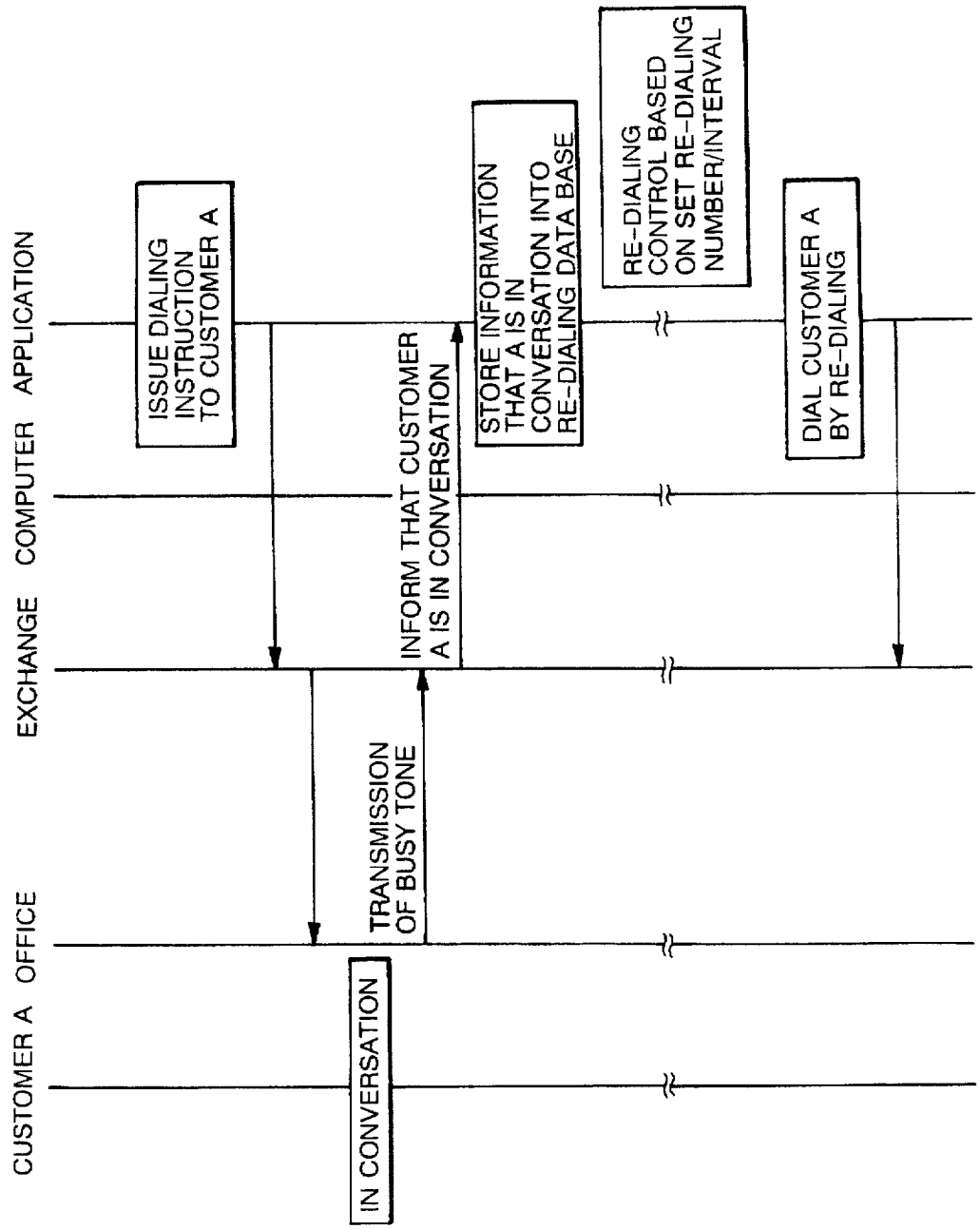
FIG. 4 is a diagram showing one example of the operation sequence during conversation, for illustrating the operation of the automatic dialing system of FIG. 1.

One example of the operation sequence during conversation is shown in FIG. 4. As shown in FIG. 4, if a dialing instruction for the customer A is issued to the exchange 4 via the computer 2 according to the application, that is, automatic dialing program, the customer A is called via the telephone office of the public circuit network 8 from the exchange 4. At this time, since the customer A is in conversation, a busy tone is sent back from the telephone office to the exchange 4 and the exchange 4 informs the application or automatic dialing program that the customer A is in conversation, via the computer 2. The application stores information that the customer A is in conversation into the re-dialing data base (for example, it is stored into the customer DB 6). In the application, the number of re-dialings and the re-dialing interval which is relatively short, as described above, are previously set as required. When time of the re-dialing interval has elapsed, the application issues an instruction of re-dialing for the customer A to the exchange 4. In this case, the re-dialing is made at the same time as the additional dialing, but it is possible to effect the re-dialing at each re-dialing interval independently from the additional dialing.

In the operation of calculating the number of additional dialing calls in the step S17, since a call is made after a short period of time to the customer to be re-dialed because of the fact that the customer is in conversation even if the customer is not actually being called, "1" may be added to the number L of calls during the dialing.

If the absence-of-customer state is determined in the step S14, it is generally impossible to estimate when the customer comes back if the customer is absent, and therefore, it is set to re-dial after a relatively long period of time, for example, after several hours or several days (step S19) and the process is returned to the step S17.

Figure 5:
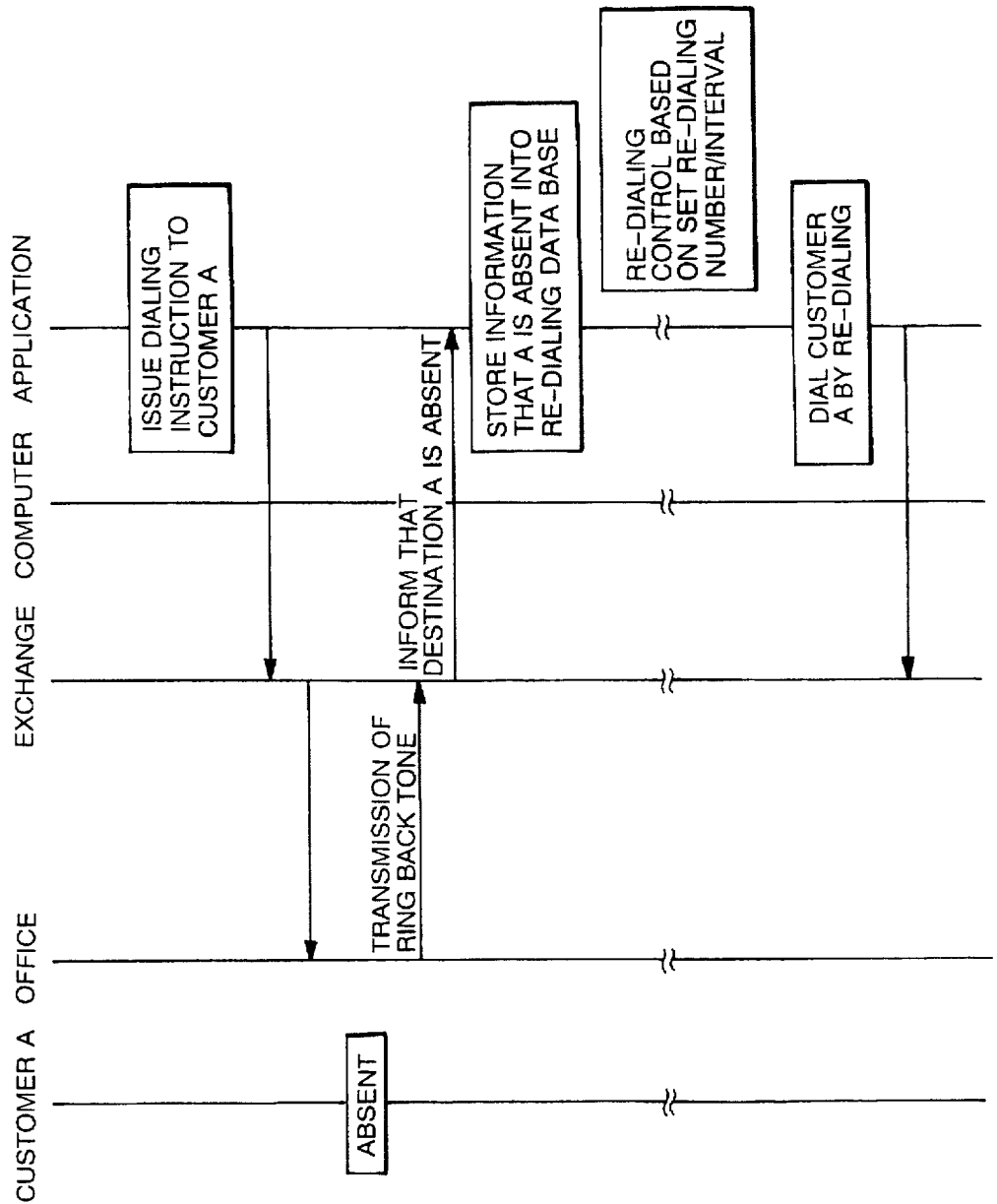
FIG. 5 is a diagram showing one example of the operation sequence during the absence, for illustrating the operation of the automatic dialing system of FIG. 1.

One example of the operation sequence at the time of absence is shown in FIG. 5. As shown in FIG. 5, if a dialing instruction for the customer A is issued to the exchange 4 via the computer 2 according to the application, that is, automatic dialing program, the customer A is called via the telephone office of the public circuit network 8 from the exchange 4. At this time, since the customer A is absent and no response is made, a ring back tone is successively sent back to the exchange 4 from the telephone office, and if the state in which the ring back tone is successively sent back to the exchange continues for a preset period of time previously adequately set or more, the exchange 4 informs that the customer A is absent to the automatic dialing program which is the application via the computer 2. The application then stores information of absence of the customer A into the re-dialing data base in the system. In the application, the number of re-dialings and the re-dialing interval which is relatively long as described above are previously set as required. When time of the re-dialing interval has elapsed, the application issues an instruction of re-dialing for the customer A to the exchange 4. In this case, the re-dialing may be made at the same time as the next additional dialing described before.

In the operation of calculating the number of additional dialing calls in the step S17, the customer to be re-dialed is not necessarily taken into consideration if the dialing call for the re-dialing is not being made.

Thus, since the target operating efficiency μ is adequately set, a customer can be called by the automatic dialing according to the target operating efficiency μ based on the responding rate α, the actual dialing condition and the serviceable condition of the operator and the communication via the operator can be attained. Then adequate automatic dialing with high operating efficiency can be achieved.

Specifically, for example, as shown in FIG. 3, if the number m of operators is 20, the target operating efficiency μ is 80%, number k of the operators in conversation is 2, the number w of working operators is 2, the number L of calls during the dialing is 3, and the responding rate α is 40%, then the number of additional dialing calls derived by the equation (3) becomes 27. If the response expected by the system is made, the number of responding customers becomes 12, and 12 responding lines will be connected to the telephone sets $12_1, 12_2, \ldots, 12_m$ of the operator for the 16 serviceable operators.

Thus, in the automatic dialing system of this invention, the number of destinations to be additionally extracted is derived based on the number of serviceable operators and the number of unresponding destinations to be re-dialed. The telephone numbers of the destinations are additionally extracted from the destination data base based on the thus derived extracted number of destinations. The automatic dialing is then made again to the extracted telephone numbers and the telephone numbers of the unresponding destinations to be re-dialed and the operator is called and connected to the line of the destination which has made a response. Therefore, in the automatic dialing system, the number of dialing calls can be adequately set according to the service condition, the waiting time of the operator can be effectively reduced and the operating efficiency can be enhanced. At this time, the factor for determining the number of dialing calls, the rate of responding by the destination for each time factor including at least one of: time zone, day of the week, date and month, the elapse time, the target operating efficiency, the number of operators who are neither in conversation nor in operation, and the reason of the unresponding of the destination can be used.

Further, in the automatic dialing system, the re-dialing can be effectively effected to meet the condition of the destination by discriminating the reason of the unresponding for the unresponding destination according to whether the destination was determined as an unresponding destination in the preceding cycle because the destination was in conversation or because the destination did not make a response and re-dialing the unresponding destination after a preset period of time corresponding to the reason of the unresponding has elapsed.

Second Embodiment

Figure 9:
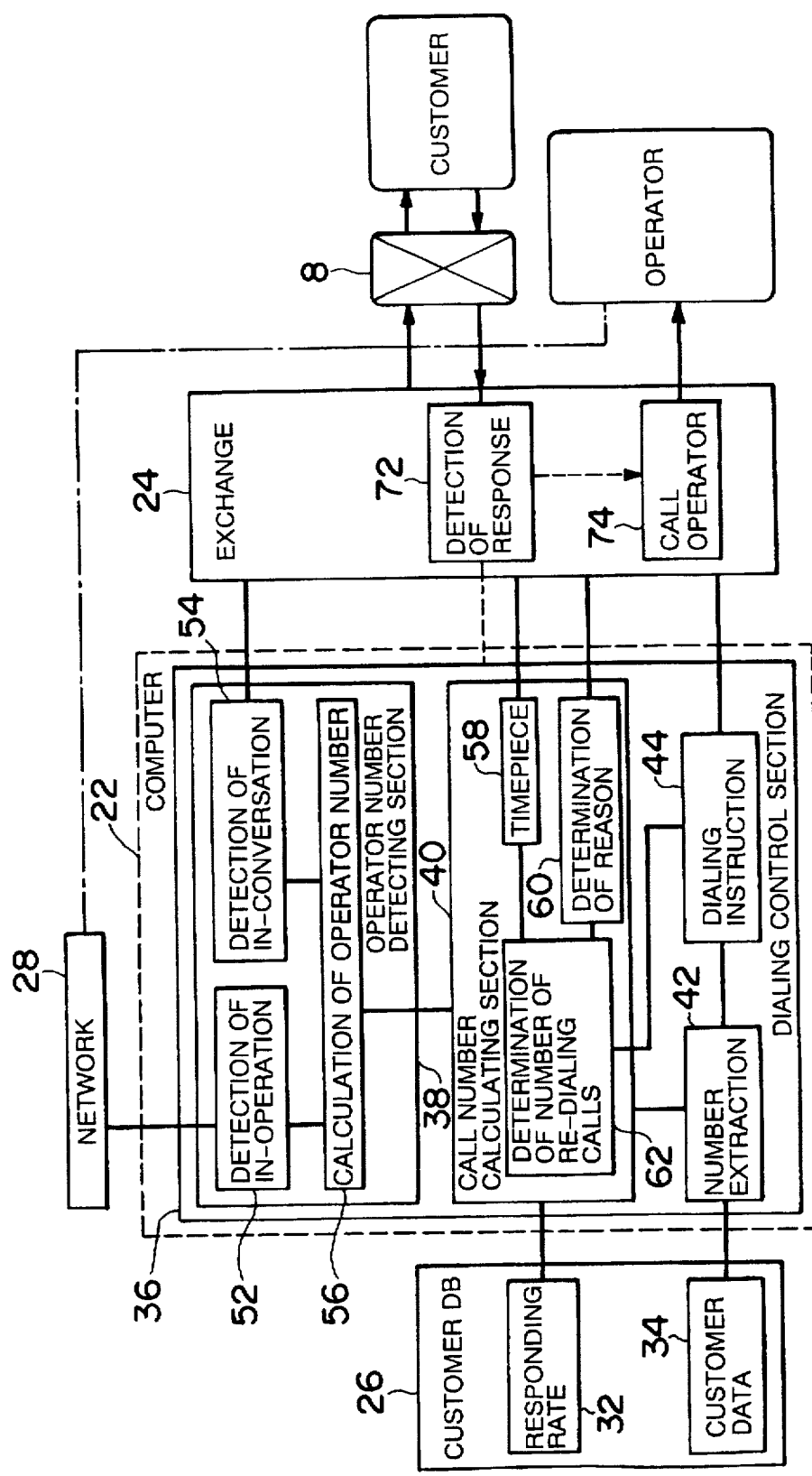
FIG. 9 is a block diagram showing the construction of a second embodiment of an automatic dialing system according to this invention.

FIG. 9 shows the functional construction of an automatic dialing system according to a second embodiment of the present invention.

The automatic dialing system of FIG. 9 is an automatic dialing system which is more concretely constructed based on the same principle as the system shown in FIGS. 1 and 3 and includes a computer 22, exchange 24, customer DB 26 and network 28.

The customer DB 26 has a responding rate storage section 32 and a customer data storage section 34. As described before, the responding rate storage section 32 stores a responding rate table for each time zone, day of the week, month and day, for example. The possibility that the customer is neither absent nor in conversation, and can make a response, is indicated by the responding rate table. In an ordinary case, the operation is effected to cope with a difference in the responding rate according to whether the time zone is the daytime or nighttime, whether the daytime is the meal time or not, the time for going to office or not, or the time for leaving the office or not, whether the day of the week is the holiday such as Saturday/Sunday or not, the week end or not, or the beginning of the week or not, or whether the month and day are vacation time or not, the settlement term or not, or the good season for an outing or not. The customer data storage section 34 stores telephone numbers of the customers and the like. The re-dialing data base described before is also stored in the customer DB 26. It is possible to store the re-dialing data base in the customer data storage section 34 of the customer DB 26.

The network 28 is a network such as a local area network (LAN) for connecting terminal devices such as work stations placed at hand of the operators.

The computer 22 has a dialing control section 36 which includes an operator number detecting section 38, call number calculating section 40, number extracting section 42 and dialing instructing section 44.

The operator number detecting section 38 has an in-operation detecting section 52, in-conversation detecting section 54 and operator number calculating section 56. The in-operation detecting section 52 extracts information on the operating condition of the terminal device of the operator via the network and detects the operator in operation or working based on the information on the operating condition. The in-conversation detecting section 54 detects the calling condition of the telephone of the operator based on the line using condition to detect the operator who is in conversation. The operator number calculating section 56 determines the operator who is neither working nor in conversation based on the results of detection by the in-operation detecting section 52 and in-conversation detecting section 54 and calculates the number of serviceable operators.

The call number calculating section 40 effects the calculation according to the equation (1) (that is, equation (2) or (3)) to calculate the number of calls to be dialed such as the number of additional dialing calls. Further, the call number calculating section 40 includes a timepiece section 58, reason determining section 60 and re-dialing call number determining section 62. The timepiece section 58 counts the time of the re-dialing interval for re-dialing and counts the time of a period of duration of a ring back tone of the customer. The reason determining section 60 determines the reason for re-dialing at the time of re-dialing and determines the absence/in-conversation in a case wherein no response is made when a call is issued to the customer. The re-dialing call number determining section 62 determines the number of calls to be re-dialed by the re-dialing based on the re-dialing interval and the reason for re-dialing derived by the timepiece section 58 and reason determining section 60. The call number calculating section 40 determines the number of calls to be dialed by adding the number of re-dialing calls derived in the re-dialing call number determining section 62 to the number L of calls during the dialing, for example, at the time of calculation of the number of calls to be dialed.

The number extracting section 42 extracts the telephone number of a customer to be dialed from the customer data storage section 34 of the customer DB 26 based on the number of calls to be dialed and derived by the call number calculating section 40. The dialing instructing section 44 gives a dialing instruction for telephone numbers extracted by the number extracting section 42 and to-be-re-dialed telephone numbers which are determined to be re-dialed by the re-dialing call number determining section 62 to the exchange 24.

The exchange 24 is constructed by a private branch exchange (PBX), for example, and effects the dialing to the customer based on the dialing instruction of the dialing instructing section 44 of the dialing control section 36 and supplies response information from the customer to the in-conversation detecting section 54, timepiece section 58 and reason determining section 60 of the dialing control section 36.

Further, the exchange 24 includes a response detecting section 72 and operator calling section 74. The response detecting section 72 detects that a response is made from the customer in response to the dialing via the public circuit network 8. The operator calling section 74 calls the telephone of the operator when a response from the customer is detected by the response detecting section 72, and if the operator makes a response, the line of the customer who has made a response is connected to the telephone set of the operator. Connection to the telephone set of the operator at the time of response from the customer may be made based on the instruction from the dialing control section 36.

With the above construction, since the target operating efficiency µ is adequately set in substantially the same manner as in the first embodiment and a customer can be called by the automatic dialing according to the target operating efficiency µ based on the responding rate α, the actual dialing condition and the serviceable condition of the operator and the communication via the operator can be attained, the adequate automatic dialing control with high operating efficiency can be achieved.

The construction of FIG. 9 is shown by dividing the function of the automatic dialing control program as the application executed in the computer 2 into a plurality of blocks, but even if the function corresponding to part of or all of the blocks is attained by use of the hardware, the same automatic dialing system can be constructed.

It is apparent that, in this invention, a wide range of different working modes can be formed based on the invention without deviating from the spirit and scope of the invention.

What is claimed is:

1. An automatic dialing method comprising the steps of:
   a) determining a quantity of dialing calls based on a quantity of serviceable operators;
   b) extracting destination telephone numbers in a quantity equal to the quantity of dialing calls, from a destination data base;
   c) automatically dialing the extracted telephone numbers;
   d) calling a telephone set of a serviceable operator and connecting the telephone set of the operator to a line of a responding destination corresponding to one of the automatically dialed extracted telephone numbers;
   e) calculating a quantity of additional destinations to be extracted based on a quantity of additional serviceable operators and a quantity of unresponding destinations, and discriminating the reason of each unresponding destination according to whether each destination was in conversation or did not make a response due to absence;
   f) extracting additional destination telephone numbers in a quantity equal to the calculated quantity of additional destinations, from the destination data base; and
   g) automatically dialing the extracted additional telephone numbers and the telephone numbers of the unresponding destinations and repeating step d) after step g).

2. An automatic dialing method according to claim 1, wherein said step e) comprises the substeps of:
   i) deriving a quantity of operators in conversation; and
   ii) deriving the quantity of additional serviceable operators based on the derived quantity of operators in conversation and a total quantity of operators.

3. An automatic dialing method according to claim 1, wherein said step e) comprises the substeps of:
   i) deriving a quantity of operators in conversation; and
   ii) deriving the quantity of serviceable operators based on the derived quantity of operators in conversation, a derived quantity of operators in operation and a total quantity of operators.

4. An automatic dialing method according to claim 1, wherein said step e) comprises the substeps of:
   i) determining whether or not a preset period of time has elapsed after a determination of an unresponding destination in a preceding cycle; and
   ii) deriving the quantity of unresponding destinations which are to be re-dialed based on the unresponding destinations in which the preset period of time is determined to have elapsed.

5. An automatic dialing method according to claim 1, wherein said step e) comprises the substeps of:
   i) determining whether or not a preset period of time corresponding to the reason for the unresponding has elapsed after the last call for each unresponding destination; and
   ii) deriving the quantity of unresponding destinations which are to be re-dialed based on the unresponding destinations in which the preset period of time is determined to have elapsed.

6. An automatic dialing method according to claim 1, wherein said step e) comprises a substep of determining the quantity of destinations to be additionally extracted according to a predetermined target operating efficiency.

7. An automatic dialing method according to claim 1, wherein said step e) comprises a substep of determining the quantity of destinations to be additionally extracted according to a rate of response for each previously prepared time factor.

8. An automatic dialing method according to claim 7, wherein said time factor includes a time zone, day of the week, date and month.

9. An automatic dialing method according to claim 7, further comprising a step of updating the rate of response based on a response history.

10. An automatic dialing method comprising the steps of:
    a) discriminating a reason of unresponding according to whether a destination was determined as an unresponding destination in a preceding cycle because the destination was in conversation or because the destination did not make a response due to absence;
    b) re-dialing the unresponding destination after a preset period of time, which is determined based on said reason of unresponding, has elapsed; and
    connecting a telephone of a serviceable operator, of a predetermined quantity of serviceable operators, to the unresponding destination upon receiving a response.

11. An automatic dialing apparatus comprising:
    operator quantity detecting means for detecting a quantity of serviceable operators;
    call quantity calculating means for cyclically deriving a required quantity of destinations to be newly extracted according to a quantity of unresponding destinations to be re-dialed and a quantity of serviceable operators, wherein said call quantity calculating means includes reason discriminating means for discriminating a reason of the quantity of unresponding destinations according to whether the destination was determined as an unresponding destination in a preceding cycle because the destination did not make a response due to absence;
    number extracting means for extracting telephone numbers of to-be-called destinations in a quantity equal to the required quantity of destinations, from a destination data base;
    dialing means for automatically dialing the extracted telephone numbers and the telephone numbers of the unresponding destinations to be re-dialed; and
    operator calling means for calling and connecting a telephone of a serviceable operator to a line of the destination which has made a response.

12. An automatic dialing apparatus according to claim 11, wherein said operator quantity detecting means comprises:
    number-of-operators-in-conversation calculating means for deriving a quantity of operators in conversation; and
    operator quantity calculating means for deriving the quantity of serviceable operators based on the derived quantity of operators in conversation and a total quantity of operators.

13. An automatic dialing apparatus according to claim 11, wherein said operator quantity calculating means comprises:
    number-of-operators-in-conversation calculating means for deriving the quantity operators in conversation;
    number-of-operators-in-operation calculating means for deriving the quantity of operators in operation; and
    operator number calculating means for deriving the quantity of serviceable operators based on the derived quantity of operators in conversation, the derived quantity of operators in operation and a total quantity of operators.

14. An automatic dialing apparatus according to claim 11, wherein said call quantity calculating means comprises:
    time determining means for determining whether or not a preset period of time has elapsed after the unresponding destination was determined as unresponding in a preceding cycle; and
    re-dialing determining means for determining unresponding destinations to be re-dialed based on the unresponding destinations in which the preset period of time is determined to have elapsed.

15. An automatic dialing apparatus according to claim 11, wherein said call quantity calculating means comprises:
    time determining means for determining whether or not a preset period of time corresponding to the reason for the unresponding has elapsed after the unresponding destination in a preceding cycle; and
    re-dialing determining means for determining unresponding destinations which are to be re-dialed based on the unresponding destinations in which the preset period of time is determined to have elapsed.

16. An automatic dialing apparatus according to claim 15, wherein said time determining means includes means for setting the elapse time to be determined longer in a case where the reason of the unresponding is that the destination did not make a response due to absence than in a case where the reason of the unresponding is that the destination was in conversation.

17. An automatic dialing apparatus according to claim 11, wherein said call quantity calculating means includes means for determining the quantity of destinations to be dialed according to a predetermined target operating efficiency.

18. An automatic dialing apparatus according to claim 11, wherein said call quantity calculating means includes means for determining the quantity calculating means includes means for determining the quantity number of destinations to be dialed according to the rate of response for each previously prepared time factor.

19. An automatic dialing apparatus according to claim 11, wherein said call quantity calculating means includes means for determining the quantity of destinations to be dialed according to the rate of response for each previously prepared time factor including a time zone, day of the week, date and month.

20. An automatic dialing apparatus according to claim 18, further comprising means for updating the rate of response based on a response history.

21. An automatic dialing apparatus comprising:
    reason discriminating means for discriminating a reason of unresponding according to whether a destination was determined as an unresponding destination in a preceding cycle because the destination was in conversation or because the destination did not make a response due to absence; and re-dialing means for re-dialing the unresponding destination after a preset period of time, which is determined based on said reason of unresponding, has elapsed; and connecting a telephone of a serviceable operator, of a predetermined quantity of serviceable operators, to the unresponding destination upon receiving a response.

22. An automatic dialing method according to claim 8, further comprising a step of updating the rate of response based on a response history.

23. An automatic dialing apparatus according to claim 19, further comprising means for updating the rate of response based on a response history.

* * * * *